Aug. 1, 1967 S. W. KULIG 3,333,481
RIGHT-ANGLED TRANSMISSION WITH METHOD
OF AND APPARATUS FOR MAKING SAME
Filed March 17, 1965 4 Sheets-Sheet 1

INVENTOR.
Stanley W. Kulig
BY
Edward S. Blodgett
Attorney

Aug. 1, 1967 S. W. KULIG 3,333,481
RIGHT-ANGLED TRANSMISSION WITH METHOD
OF AND APPARATUS FOR MAKING SAME
Filed March 17, 1965 4 Sheets-Sheet 2

INVENTOR.
Stanley W. Kulig
BY
Monas S. Blodgett
Attorney

United States Patent Office 3,333,481
Patented Aug. 1, 1967

3,333,481
RIGHT-ANGLED TRANSMISSION WITH METHOD OF AND APPARATUS FOR MAKING SAME
Stanley W. Kulig, West Millbury, Mass., assignor to Harrington & Richardson, Inc., Worcester, Mass., a corporation of Massachusetts
Filed Mar. 17, 1965, Ser. No. 440,368
12 Claims. (Cl. 74—417)

This invention relates to a transmission and, more particularly, to apparatus arranged to transmit power from one shaft to another at a right angle to it.

One of the most commonly used machine elements is a right-angled gear box transmission. This apparatus is used when power arriving on a shaft in one direction must be re-directed at a right angle. Such a transmission usually consists of a housing having input and output shafts extending at right angles to one another, each shaft having on the interior of the housing a bevel gear for the transmission of the power. It has, in the past, been necessary to construct such housings of cast iron or the like and to machine them carefully to receive bearings for the shafts. This is an expensive procedure but, nevertheless, it has been impossible to make the housing in any other way. It should be noted, however, that the housing need not be particularly strong, because of the fact that there is little or no reaction force between the shafts and their bearings aside from thrust forces in the direction of the shafts, so that there is really no necessity for such a strong housing. All attempts to manufacture the housing of inexpensive materials, however, have failed because of the necessity that the bores to carry the shaft bearings must be accurately located at right angles to one another. For these and other reasons, right-angled transmissions in the past have been very expensive, despite all attempts to make them cheaper. These and other difficulties experienced with the prior art devices have been obviated in a novel manner by the present invention.

It is, therefore, an outstanding object of the invention to provide a transmission which is inexpensive to manufacture but which, nevertheless, is capable of withstanding normal transmission forces.

Another object of this invention is the provision of a right-angle transmission having a housing formed of plastic which requires no machining to assure that the axes of the bores are accurately located.

A further object of the invention is the provision of a method of manufacturing a right-angle transmission with a plastic housing.

It is another object of the instant invention to provide a mold for manufacturing the housing of a right-angle transmission from plastic.

It is a further object of the invention to provide a right-angle transmission having a plastic housing, a method of manufacturing such a transmission, and a mold for carrying out the said method.

A still further object of this invention is the provision of a transmission having a plastic housing, which transmission is simple in construction, inexpensive to manufacture, and which is capable of a long life of useful service with a minimum of maintenance.

It is a still further object of the present invention to provide a process for manufacturing a right-angle transmission in which the angular relationship of the axes of the shafts are accurately determined and provision is made for assuring that the pitch lines of the bevel gears are accurately related.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings in which.

Figure 1:
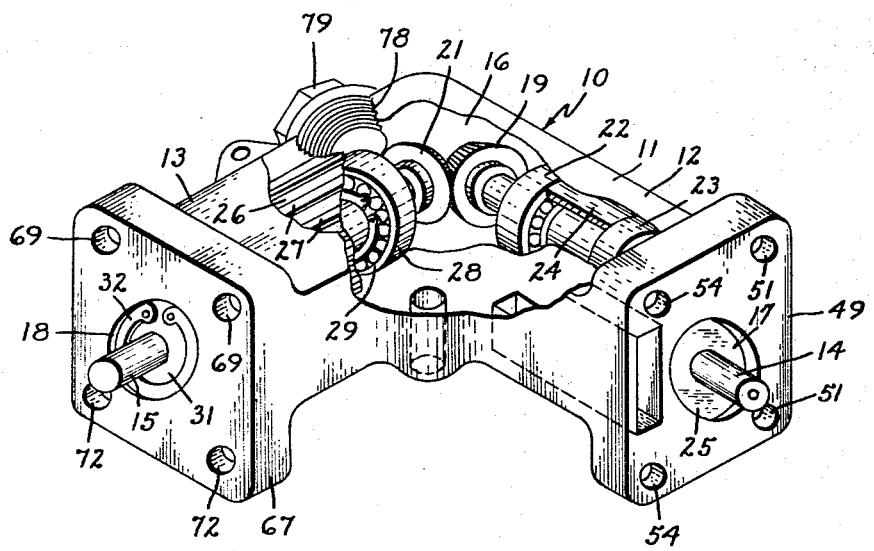
FIG. 1 is a perspective view with portions broken away of a transmission embodying the principles of the present invention.

Referring first to FIG. 1, wherein are best shown the general features of the invention, the transmission, indicated generally by the reference numeral 10 is shown as consisting of a housing 11, having a first leg 12 and a second leg 13 extending at a right angle to one another. The housing 11 is formed of a plastic material which, in the preferred embodiment, consists of a high-impact polymer. Extending from the first leg 12 is an input shaft 14 which lies lengthwise of the leg and centrally thereof. In a similar manner, an output shaft 15 protrudes from the free end of the second leg 13, lies centrally of the leg, and extends longitudinally thereof. The housing 11 is hollowed to form a chamber 16 consisting partly of a passage 17 which extends lengthwise of the leg 12 and emerges from its free end. In a similar manner, a portion of the chamber 16 provides a passage 18 which extends along the leg 13 and emerges from its free end. The input shaft 14 lies in the passage 17, while the output shaft 15 lies in the passage 18. Mounted on the inner end of the input shaft 14 and lying within the chamber 16 at the intersection of the passages 17 and 18 is a bevel gear 19. In a similar manner, the bevel gear 21 is mounted on the inner end of the output shaft 15.

Mounted in the passage 17 are two sealed roller bearings 22 and 23 which are held in spaced relationship by a spacer 24. The input shaft 14 is held in the inner races of these bearings and is rotatable therewith. The spacer 24 is tubular and has an outer diameter somewhat less than the outer diameter of the outer races of the bearings; this tubular spacer extends between the facing radial surfaces of the outer races of these bearings and is held tightly between them. In the formation of the housing the plastic material flows around the outer races of both bearings at their ends and inwardly between them as far as the outer surface of the spacer; this means that the passage 17 is formed with inwardly-directed flanges which lock around the outer races of the bearings and hold them tightly in place. Locked into the opening of the passage 17 at the end of the leg 12 and surrounding the shaft 14 closely is a seal plate 25.

Mounted in the passage 18 in the leg 12 is a tubular sleeve formed of aluminum and provided on its outer surface with longitudinal ridges 27 around which the plastic material of the housing 11 is molded to lock the sleeve in place. Mounted in the inside bore of the sleeve 26 is a sealed ball bearing 28 and spaced from it along the passage is another sealed ball bearing (not shown). The two ball bearings are kept in spaced relationship by a tubular spacer extending between the outer races 29. Fitted into the outer end of the passage 18 at the end of the leg 13 is a sealing plate 31 which has a central aperture closely embracing the output shaft 13 and held in place by a lock washer 32 which operates in a shallow groove in the sleeve 26. The output shaft 15 is, of course, held in the inner races of the bearing 28 and its partner bearing and is rotatable by this means.

Figure 2:
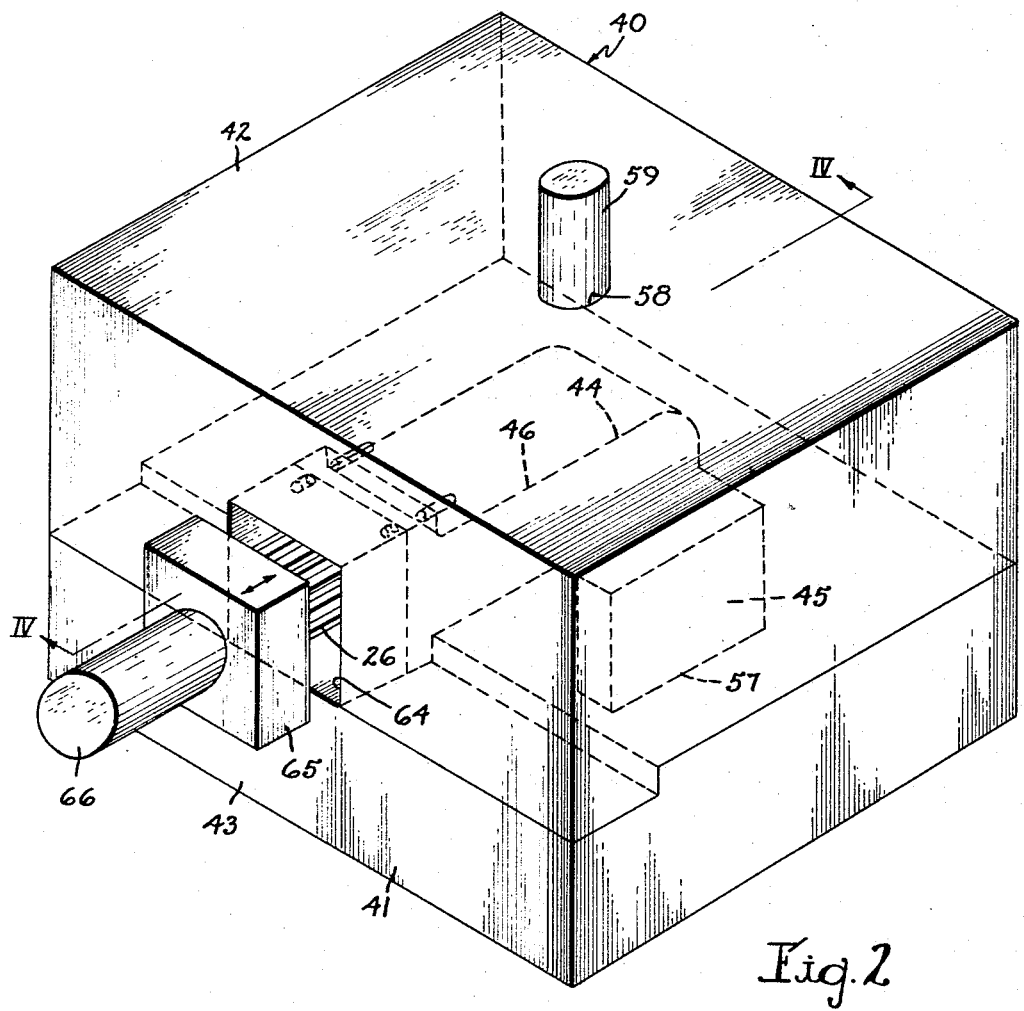
FIG. 2 is a perspective view of a mold used in the manufacture of the invention.
Figure 3:
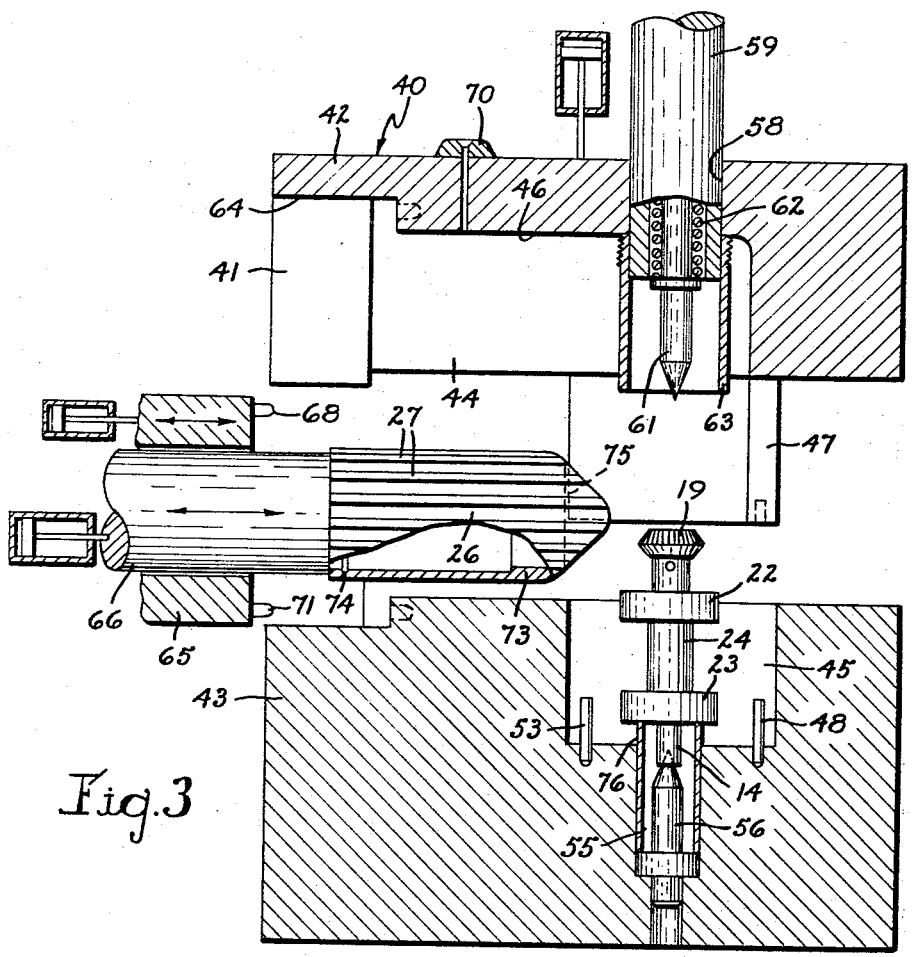
FIG. 3 is a vertical sectional view of the mold in open condition.
Figure 4:
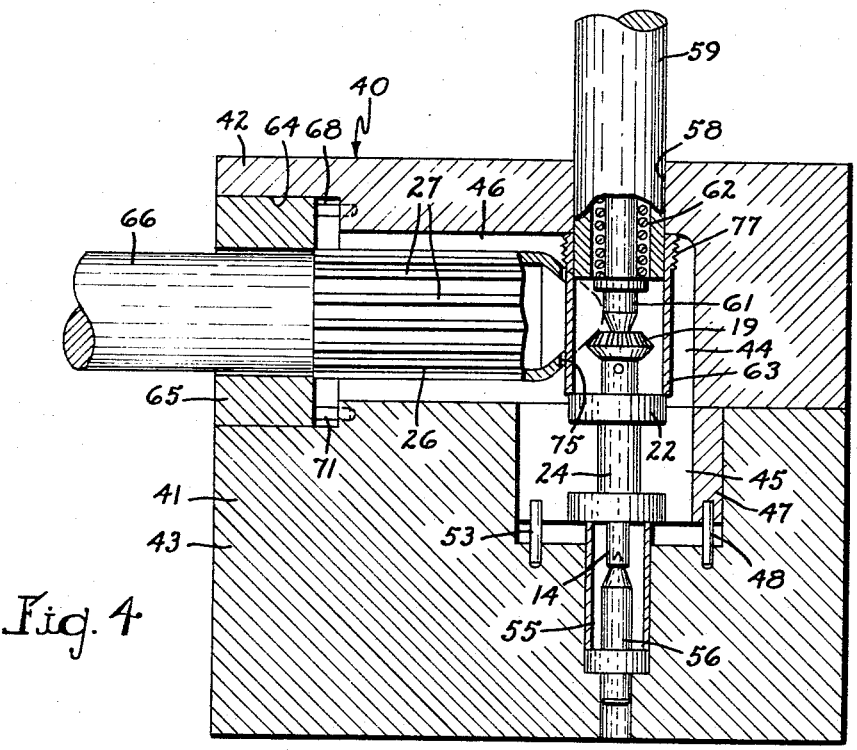
FIG. 4 is a vertical sectional view if the mold in closed condition taken on the line IV—IV of FIG. 2.

FIGS. 2, 3, and 4 show the details of a mold 40 used in the manufacture of the transmission shaft. The mold is provided with a solid steel mold body 41 separable into an upper portion 42 and a lower portion 43. The facing surfaces of the upper portion and the lower portion of the mold body are hollowed out to form a cavity 44 having the general form of the housing 11 of the transmission. This cavity has two legs at right angles to one another corresponding to the legs of the housing 11; that is to say, the cavity has a leg 45 corresponding to the leg 12 of the housing and a leg 46 corresponding to the leg 13 of the housing. Extending downwardly from the upper portion of the mold body is a bar 47 which fits into one side of the leg 45, but does not reach its bottom, thus defining during the molding operation a flange 49 on the housing 11 of the transmission. Extending upwardly from the bottom of the leg 45 are pins 48 which fit into corresponding sockets on the bar 47 which serve to provide the apertures 51 in the flange 49. Pins 53 extend upwardly from the leg bottom of the leg 45 into suitable recesses in the bottom of laterally-extending sides of the bar 52 to assist in forming the apertures 54 in the flange. In order to form the other two sides of the flange 49, the two sides are provided on the bar 47, these being the sides 57 shown in FIG. 2.

The bottom of the leg 45 is provided with a recess 55 in which is fixedly mounted an upwardly-directed center 56 having a conical point at its upper end. Similarly, the cavity is formed in the upper portion with an upwardly-directed bore 58 which is aligned with the recess 55. Within the bore 58 resides a post 59 having a counterbore at its lower end which carries a vertically slidable center 61 which is spring-biased to a downward position by a coil spring 62. Fastened to the bottom end of the post 59 and coaxial of the center 61 is a tube 63 having an inside diameter somewhat less than the outside diameter of the bearing 22 and long enough so that, when the upper and lower portions of the mold body are brought together, it contacts the outer race of the bearing 22 tightly. When the upper portion 42 and the lower portion 43 of the mold body 41 are pressed together along the parting line, a square opening 64 appears at the end of the leg 46. In this opening fits a block 65 forming part of a mold machine side action, as is well known in this field. Through an aperture in the center of this block extends a rod 66 having the same diameter as the inside diameter of the sleeve 26 and mounted independently of the block 65. As is obvious in FIG. 4, the block fits into the opening 64, which is somewhat larger than the main part of the leg 46. The block 65 does not meet the shoulder between the smaller portion of the leg 46 and the opening 64 so that this gap defines a flange 67 on the transmission housing during the molding process. Upper pins 68 on the block 65 define apertures 69 in the upper part of flange 67 of the housing, while a similar pair of pins 71 define apertures 72 in the bottom part of the flange. In FIG. 3 can be seen an interior shoulder 73 on the interior of the sleeve 26 and it is against this shoulder that the bearing 28 is locked. In this same view can be seen the groove 74 into which the snap ring 34 is inserted to hold the seal plate 31 in place. Now, the inner end of the sleeve 26 contacts the outer surface of the tube 63 in tight sealing relationship during molding and this is done by providing the inner end of the tube 46 with a notch 75, as is obvious in FIGS. 3 and 4.

The operation of the apparatus will now be readily understood, in view of the above description. The mold 40 is placed in a conventional injection molding machine which is loaded with plastic material. The upper portion 42 of the mold body 41 is in raised position, as shown in FIG. 3. A unit consisting of an input shaft 14, a bevel gear 19, a bearing 22, a bearing 23, and a spacer 24 are placed in position over the center 56. The outboard end of the input shaft 14 is provided with a small center hole in the usual way and the other end which carries the bevel gear 19 is similarly formed. The unit is held in place by means of a tube 76 in the bottom of the leg 45 of the mold cavity. The unit stands vertically with the bearing 23 contacting the upper edge of this tube. The unit is, therefore, self-supporting with the upper center hole generally aligned with the center 61. The rod 66 is introduced into the leg 46 of the cavity and is held in the position shown in FIG. 3 far enough to the left so that, when the upper portion moves downwardly, the bar 52 is able to move into place without striking the end of the sleeve 26. The upper portion 42 is moved downwardly and the bar 47 occupies its place in the bottom of the leg 45 as does the bar 52. This arrangement is clearly shown in FIG. 4. Then the rod 66 is moved to the right so that the notch 75 engages the outer surface of the tube 63. The tube 63, incidentally, has contacted the upper surface of the bearing 22 and formed a tight seal. At the same time, the center 61 has forced itself into the conical hole at the upper end of the input shaft 14 and causes the input shaft to be centered so that it is perfectly aligned with the center 56 and with the center 61. The upper center 61 is spring-biased by the spring 62 to prevent any damage. Then, the side action moves the block 65 into place, so that the mold is now in condition for the injection of the plastic material. When injection takes place (through an injection port 70), the space between the end of the block 65 on the one hand and the shoulder between the opening 64 and the leg 46 of the mold cavity on the other hand fills with plastic to form the flange 67 of the transmission body. Of course, the pins 68 and 71 form the openings 69 and 72 in the flange. In a similar manner, the plastic flows around the lower end of the bars 47 to form the flange 49, while the pins 53 and 48 define the apertures 51 and 54, respectively. The plastic fills the legs 45 and 46 of the mold cavity but the contact of the sleeve 26 against the outer surface of the tube 63 prevents any plastic from gonig into the sleeve 26, although the sleeve is locked in place by the flow of plastic around the ridges 27. Similarly, the contact of the tube 63 with the bearing 22 provides a space in the housing into which the plastic will not flow. It is interesting to note that the outer surface of the tube 63 can be provided with threads 77 which form similar threads 78 in the housing and permit the introduction of a grease access plug 79; in such a case, the sleeve would have to be un-threaded before the tube could be removed from the mold. The plastic does flow around the spacer 24 and around the bearings 22 and 23 to lock them in place in the housing. After the plastic has been completely injected, it is necessary to remove the block 65 with its pins 68 and 71 before the upper portion can be moved upwardly away from the lower portion of the mold. Similarly, the rod 66 must be withdrawn from the sleeve 26 through the aperture in the block 65. Once the upper portion has been lifted out of the way with the bar 47 and the pins 53 and 48 are also withdrawn, it is possible to remove the transmission. When this is done, the unit associated with the input shaft 14 stays with the plastic housing which has been molded; so does the sleeve 26. It is only necessary, then, once the partially-finished transmission has been removed from the mold, to insert in the sleeve 26 another unit consisting of the output shaft 15, bearing 28, and the other bearing, as well as the bevel gear 21 and the spacer 29. These are locked in place against the shoulder 73 of the sleeve 26 and the units held in that position by the sealing plate 31 and the locking ring 32.

It can be seen, then, that the transmission can be constructed with a plastic housing which is light and strong and which is capable of resisting all of the forces to which a housing would normally be subjected. At the same time, it would be possible by use of this method and apparatus to assure that the pitch lines of the two gears 19 and 21 were suitably arranged relative to one another to give the most effective power transmission. The operation of the rod 66 can be controlled to present the sleeve 26 to the proper position in the mold lengthwise of the rod. This, of course, determines the point at which the shoulder 73 rests and, therefore, determines the lengthwise position of the gear 21. The lateral position of the shaft 15 relative to the shaft 14 is best adjusted by regulating the length of the sleeve 76 which, in turn, determines the position of the shaft 14 in the mold. In this way, absolutely accurate positioning of the input and output shafts and their engaging members is brought about.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A transmission, comprising
   (a) a housing formed of a plastic material,
   (b) an input shaft having a bearing mounted in the housing,
   (c) an output shaft having a bearing mounted in the housing and having its axis at a substantial angle to the input shaft,
   (d) a bevel gear on each of the said shafts, the gears being located in meshing engagement, and
   (e) an elongated metal sleeve mounted in the housing, the bearing of one of the shafts being mounted in the sleeve and supporting the shaft along most of its length.

2. A transmission as recited in claim 1, wherein the bearing of the other of the shafts is partially embedded in the plastic material of the housing.

3. A transmission as recited in claim 1, wherein the metal sleeve is provided on its inner bore with a shoulder against which the bearing is held.

4. A transmission, comprising
   (a) a housing formed of a plastic material,
   (b) an input shaft having an bearing mounted in the housing,
   (c) an output shaft having a bearing mounted in the housing and having its axis at a substantial angle to the input shaft,
   (d) a bevel gear on each of the said shafts, the gears being located in meshing engagement, and
   (e) a metal sleeve mounted in the housing, the bearing of one of the shafts being mounted in the sleeve, the outer surface of the sleeve being provided with ridges which are embedded in the plastic material of the housing.

5. A method of manufacturing a transmission, comprising the steps of:
   (a) providing a mold cavity having the shape of the outer surface of a transmission housing,
   (b) mounting one set of shaft, bearing and gear in the cavity,
   (c) introducing into the cavity a tube aligned with the shaft and the gear,
   (d) introducing into the cavity a sleeve at a substantial angle to the tube and sealing thereagainst,
   (e) introducing into the cavity a plastic material to fill the space within the cavity around the sleeve, the tube and the said unit,
   (f) removing the article thus formed from the mold, and
   (g) mounting in the sleeve a second unit of shaft, bearing, and gear.

6. A method of manufacturing a transmission as recited in claim 5, wherein the plastic material is introduced around the outer surface of the sleeve to flow around ridges on the said outer surface.

7. Apparatus for molding a transmission, comprising
   (a) a mold body having a cavity of the shape of a housing of the transmission, the housing having two legs at a substantial angle to each other,
   (b) a first center mounted in the body and extending lengthwise of one leg,
   (c) a second center mounted in the body and extending toward the said first center from the opposite side of the cavity, the centers being adapted to hold a unit of a shaft, bearing, and gear in the cavity lengthwise of the said one leg, and
   (d) a rod extending into the cavity lengthwise of the other leg, the rod being adapted to support a sleeve centrally of the said leg.

8. Apparatus as recited in claim 7, wherein the mold body is divided into two parts by a parting plane parallel to the centerline of the said other leg.

9. Apparatus as recited in claim 8, wherein one portion of the mold body is movable toward and away from the other and the said first and second centers are each mounted, one center in one portion or the other center in the other portion, with their axes aligned in the direction of movement of the said one portion.

10. Apparatus as recited in claim 7, wherein is provided a tube coaxial of the second center and adapted to extend around the gear during the flow of plastic material into the mold cavity.

11. Apparatus as recited in claim 7, wherein the said second center is mounted in the mold body for sliding axial movement and is spring-biased toward the mold cavity.

12. Apparatus as recited in claim 7, wherein a block surrounds the rod and is movable in the direction of its axis and the mold is provided with an access opening which is closed by the block during molding.

References Cited

UNITED STATES PATENTS 2,915,912   12/1959   Hussar _____ 74—417 X

ROBERT M. WALKER, *Primary Examiner.*

DAVID J. WILLIAMOWSKY, *Examiner.*

L. H. GERIN *Assistant Examiner.*